United States Patent Office 3,184,448
Patented May 18, 1965

3,184,448
BENZODIAZEPINIUM COMPOUNDS
Peter Hsing-Lien Wei, Upper Darby, Pa., assignor to American Home Products Corporation, New York, N.Y., a corporation of Delaware
No Drawing. Filed Oct. 16, 1962, Ser. No. 230,995
6 Claims. (Cl. 260—239.3)

This invention relates to novel psychotherapeutic and hypotensive compounds and to processes for making the same.

More specifically, the invention is concerned with 5,7-dihydro - 6-oxo-6H-pyrido(1,2-d)(1,4)benzodiazepinium halides, the letter "d" being used as shown in the formula below to locate the point of attachment of the pyridine ring to the diazepine ring.

The active compounds of this invention may be represented by the formula:

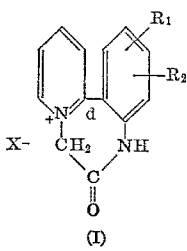

(I)

wherein $R_1$ is hydrogen, halogen, lower alkyl and haloalkyl; $R_2$ is hydrogen or halogen and X is bromine or chlorine.

Preparation of the compounds of the invention is illustrated schematically below:

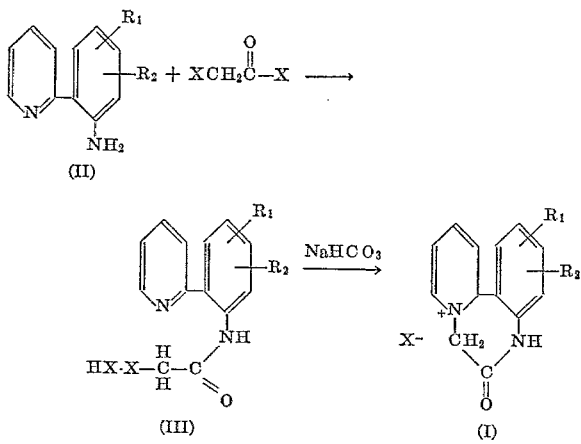

As shown above, the compounds of this invention are synthesized by reacting a 2-(o-aminophenyl)pyridine (II) in an inert solvent with a monohaloacetyl halide to form a 2-(o-haloacetamidophenyl)pyridine hydrohalide (III). Treatment of the latter product with sodium bicarbonate yields a 5,7-dihydro-6-oxo-6H-pyrido(1,2-d)(1,4)benzodiazepinium halide salt (I).

Suitable inert solvents for the first step of the above reaction include dioxane, ether, benzene, chloroform and similar solvents which are also unreactive with respect to the reactants.

During the time that the haloacetyl halide is introduced in the solution containing the pyridine compound, it is preferred that the reaction mass be cooled to a temperature of around 10 degrees C. After all the haloacetyl halide has been added, the reaction mass is stirred at room temperature. The ring closure, which may be effected by neutralizing with any alkali metal bicarbonate, is carried out at room temperature.

EXAMPLE I (A) *2-(o-chloroacetamidophenyl)pyridine hydrochloride*

To a stirred and cooled dioxane solution of 10 g. of 2-(o-aminophenyl)pyridine is slowly added a solution of 10 g. of chloroacetyl chloride in dioxane. The mixture is stirred at room temperature for one hour. The solids, which are highly hygroscopic, are collected and washed with ether.

(B) *5,7 - dihydro-6-oxo-6H-pyrido(1,2-d)(1,4)benzodiazepinium chloride (III)*

The above solids are dissolved in water and the aqueous solution treated with activated charcoal. Upon neutralization with a sodium bicarbonate solution there are obtained brown solids which are dried at room temperature. The crude material is dissolved in acetone and the acetone solution heated on a steam bath. The yellow solids which separate are collected and recrystallized from a mixture of methanol and acetone. The salt melted around 330° C.

EXAMPLE II

2 - chloro - 5,7-dihydro-6-oxo-6H-pyrido(1,2-d)(1,4)-benzodiazepinium chloride is obtained by reacting 2-(2-amino-5-chlorophenyl)pyridine with chloroacetyl chloride, as described in Example I.

EXAMPLE III

2 - bromo - 5,7-dihydro-6-oxo-6H-pyrido(1,2-d)(1,4)-benzodiazopinium chloride is obtained by reacting 2-(2-amino-5-bromophenyl)pyridine with chloroacetyl chloride, as described in Example I.

EXAMPLE IV

2 - trifluoromethyl-5,7-dihydro-6-oxo-6H-pyrido(1,2-d)(1,4)benzodiazepinium chloride is obtained by reacting 2-(2-amino-5-trifluoromethylphenyl)pyridine with chloroacetyl chloride, in the manner described in Example I.

EXAMPLE V

3 - chloro - 5,7-dihydro-6-oxo-6H-pyrido-(1,2-d)(1,4)benzodiazepinium chloride is obtained by reacting 2-(2-amino-4-chlorophenyl)pyridine with chloroacetyl chloride, as described in Example I.

EXAMPLE VI

3 - bromo - 5,7-dihydro-6-oxo-6H-pyrido-(1,2-d)(1,4)benzodiazepinium bromide is obtained by reacting 2-(2-amino-4-bromophenyl)pyridine with bromoacetyl bromide, as described in Example I.

EXAMPLE VII

2 - ethyl - 5,7-dihydro-6-oxo-6H-pyrido-(1,2-d)(1,4)benzodiazepinium chloride is obtained by reacting 2-(2-amino-5-ethylphenyl)pyridine with chloroacetyl chloride, as described in Example I. These compounds are administered in the usual pharmaceutical unit dosage forms, such as tablets, capsules, pills and the like. The compounds can be combined with various diluents, adsorbents, excipients and other inert ingredients to prepare the pharmaceutical preparation. As determined in mice, the toxicity ($LD_{50}$) of the present compounds is around 1600 milligrams per kilogram of body weight (orally) and about 75 milligrams per kilogram, intraparenterally.

The compounds of the present invention also are useful as intermediates in the preparation, by reduction or hydrogenation, of hydro-6H-pyrido(1,2-d)(1,4)benzodiazepin-6-one compounds which have valuable pharmacological properties. The latter compounds are disclosed and claimed in my co-pending application, S.N. 231,043, filed even day herewith.

What is claimed is:
1. A compound of the formula:

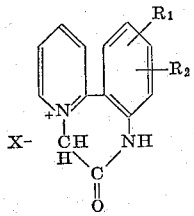

(I)

wherein $R_1$ is a member of the group consisting of hydrogen, halogen, lower alkyl and haloalkyl; $R_2$ is a member of the group consisting of halogen and hydrogen; and $X^-$ is a halogen ion selected from the group consisting of chlorine and bromine.

2. 5,7 - dihydro - 6-oxo-6H-pyrido(1,2-d)(1,4)benzodiazepinium chloride.

3. 5,7 - dihydro - 2-halo-6-oxo-6H-pyrido(1,2-d)(1,4)benzodiazepinium halide.

4. 5,7 - dihydro - 2-halo-3-halo-6-oxo-6H-pyrido(1,2-d)(1,4)benzodiazepinium chloride.

5. 2 - lower alkyl-5,7-dihydro-6-oxo-6H-pyrido(1,2-d)(1,4)benzodiazepinium chloride.

6. A process for preparing compounds having the formula:

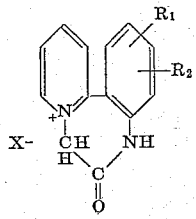

wherein $R_1$ is a member of the group consisting of hydrogen, halogen, lower alkyl and haloalkyl; $R_2$ is a member of the group consisting of halogen and hydrogen; and $X^-$ is a halogen ion selected from the group consisting of chlorine and bromine, which process comprises reacting in an inert solvent the 2-(o-aminophenyl)-pyridine having the formula:

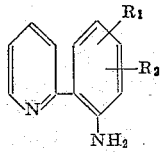

wherein $R_1$ and $R_2$ are as hereinabove, with a monohaloacetyl halide of the formula $XCH_2COX$ where X is selected from the group of chlorine and bromine to form the compound having the formula:

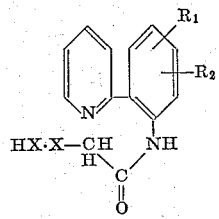

and then treating the latter compound with an alkali metal bicarbonate to produce the desired product.

References Cited by the Examiner
UNITED STATES PATENTS
3,100,770   8/63   Fryer et al. _____ 260—239

NICHOLAS S. RIZZO, *Primary Examiner.*